United States Patent
Liu (10) Patent No.: US 8,136,311 B2
(45) Date of Patent: Mar. 20, 2012

(54) SOLAR PANEL AND EQUIPMENT MOUNTING APPARATUS FOR ROOFS

(76) Inventor: Jun Liu, Camas, WA (US)

( * ) Notice: Subject to any disclaimer, the term of this patent is extended or adjusted under 35 U.S.C. 154(b) by 0 days.

(21) Appl. No.: 13/078,528

(22) Filed: Apr. 1, 2011

(65) Prior Publication Data
US 2011/0179727 A1 Jul. 28, 2011

(51) Int. Cl.
E04D 13/18 (2006.01)
E04H 14/00 (2006.01)
(52) U.S. Cl. .................................. 52/173.3; 411/374
(58) Field of Classification Search ............... 52/173.3, 52/562, 582.1, 586.1, 698, 27, 511; 411/372.5, 411/372.6, 373, 374
See application file for complete search history.

(56) References Cited

U.S. PATENT DOCUMENTS

| | | | | |
|---|---|---|---|---|
| 1,506,005 A * | 8/1924 | Kraft | .......................... | 138/89.4 |
| 2,020,522 A * | 11/1935 | Seguin | .......................... | 411/374 |
| 3,175,454 A | 3/1965 | Morse | | |
| 4,043,239 A * | 8/1977 | DeFusco | ...................... | 411/337 |
| 4,744,187 A | 5/1988 | Tripp | | |
| 4,780,571 A * | 10/1988 | Huang | .......................... | 174/484 |
| 5,205,692 A * | 4/1993 | Kelbert et al. | ................. | 411/173 |
| 5,603,187 A | 2/1997 | Merrin et al. | | |
| 6,360,491 B1 | 3/2002 | Ullman | | |
| 6,758,625 B1 * | 7/2004 | Lawrence | ..................... | 403/388 |
| 7,866,098 B2 | 1/2011 | Cinnamon | | |
| 2003/0101662 A1 * | 6/2003 | Ullman | ............................ | 52/27 |
| 2008/0121273 A1 * | 5/2008 | Plaisted et al. | ................ | 136/251 |
| 2009/0019796 A1 * | 1/2009 | Liebendorfer | ............... | 52/173.3 |
| 2010/0307074 A1 | 12/2010 | Stearns et al. | | |

FOREIGN PATENT DOCUMENTS
EP 417303 3/1991

OTHER PUBLICATIONS

"New for 2011 Unirac Flat Flashing", Unirac Attachments, Publication Date Unknown, p. 1, Unirac Inc., Albuquerque NM.
IronRidge Roof Mounts, Product Data Sheet, Jun. 2010, pp. 1-2, IronRidge Inc., Willits, CA.
Roof Trac PV Mounting System Installation Manual, 2002, pp. 1-11, Professional Solar Products.
Standoffs and Flashings Installation Manual 907, Jul. 2004, pp. 1-4, Unirac Inc., Albuquerque NM.
Self-Sealing Fasteners, Nuts, & Washers, Catalog SF500A, pp. 3-6, Jul. 2010, APM Hexseal Corporation, Englewood, NJ.

* cited by examiner

*Primary Examiner* — Basil Katcheves
*Assistant Examiner* — Theodore Adamos
(74) *Attorney, Agent, or Firm* — Alan M. Flum; Stone Creek LLC (57) ABSTRACT

Disclosed is an apparatus for mounting equipment or solar photovoltaic structures to roofs where the apparatus base plate engages the roof surface directly, creating a water resistant seal, without the need for flashing. The base plate upper surface includes an upwardly projected portion that is circumscribed by a groove. The base plate lower surface includes a counterbore. Both the counterbore and the groove are disposed to receive annular seals. A threaded fastener is received and seated the upwardly projected portion top surface and feeds through the counterbore, securing the base plate to the roof structure and creates a water resistant seal by compressing the lower annular seal and by creating surface-to-surface contact with the roof and portion of the base plate. An inwardly threaded cover portion engages the upwardly projected portion either directly or through an intermediary, creating a water resistant seal over the fastener.

16 Claims, 12 Drawing Sheets

SOLAR PANEL AND EQUIPMENT MOUNTING APPARATUS FOR ROOFS

BACKGROUND

The present invention relates to systems or apparatus for mounting equipment to roof structures. Specifically, the application relates to systems or apparatus for mounting equipment, such as solar photovoltaic panels, to sheet metal roof structures and other roof structures.

Mounting equipment on roof structures, particularly flat metal roofs, pose certain challenges. For example, the mounting apparatus must be economical to purchase and be easy to install. This is particularly true when mounting solar photovoltaic panels. Reducing both cost of the installation apparatus and simplifying the installation process can encourage the widespread use of this clean and renewable energy by helping to reduce the overall solar photovoltaic system cost and complexity.

Another challenge is to provide an equipment mounting apparatus that requires minimal maintenance. For example, over time, exposed rubber or elastomeric seals sitting on metal or other roof surfaces can age and increase the possibility of roof leakage.

At least for the foregoing reasons, there is a need for an apparatus for mounting equipment on metal roofs and other roof surfaces, including the mounting of solar photovoltaic panel structures, that simplifies installation, reduces cost, complexity and the possibility of water leakage from the mounting apparatus.

SUMMARY

The present invention is directed to an apparatus that satisfies the need for mounting equipment on metal roofs and other roof structures, including the mounting of solar photovoltaic panel structures, that simplifies installation, reduces cost, complexity and the possibility of water leakage from the mounting apparatus.

The inventor observed that the problem of elastomeric and other flexible seals prematurely aging and leaking in roof equipment or solar photovoltaic mounting systems could be reduced by minimizing exposure of the seals to air, sunlight, and moisture. In accordance with principles of the invention, the inventor devised an equipment mounting apparatus that includes a base plate and an inwardly threaded cover portion where the base plate is configured to receive a fastener through its upper surface. The base plate is disposed to receive a first compressible annular seal, such as an elastomeric seal, by a groove in the base plate upper surface, and a second annular seal by a counterbore in the base plate lower surface. The fastener is seated on an upwardly projected portion of the upper surface of the base plate and extends through the counterbore into the roof surface. The fastener compresses the second annular seal and secures a portion of the base plate bottom surface in direct contact with the roof surface. This arrangement minimizes air and light exposure to the seal and is water resistant.

The base plate and the fastener are further protected from the elements by a combination of the inwardly threaded cover portion and the upwardly projected portion, either directly or through an intermediary surface. The bottom of the cover portion compresses the first annular seal either directly or against the intermediary surface. This combination creates a water resistant seal over the fastener.

In one aspect, the combination uses an L-bracket as an intermediary between the cover and the base plate, with the cover portion and base plate securing the base plate to roof structure. The L-bracket can be bolted to a slot along the side of a rail. In this arrangement, a solar photovoltaic panel or other equipment can be attached to the rail by a clip bolted to slot along the top edge of the rail.

In another aspect, the cover portion is in the form of a standoff with an inward threaded cavity for receiving and holding the upwardly projected portion directly. The top of the standoff is disposed to receive a threaded fastener that holds the L-bracket and attaches it to the equipment in a manner similar to that described above.

For installations where the solar photovoltaic panels or other equipment need to be tilted with respect to the roof surface, it is possible to use a combination of the two arrangements described above in order to achieve this.

It may be desirable to eliminate the need for a separate L-bracket. In order to accomplish this, in one aspect, the base plate may be formed in the shape of an L-bracket while retaining the combination of the bottom surface counterbore, upper surface groove, and upwardly projected portion. The groove is disposed to receive the first annular seal and counterbore is disposed to receive the second annular seal. The base plate is configured to receive and seat the fastener into the upwardly projected portion through the counterbore and into the roof surface, compressing the second annular seal. This arrangement secures a portion of the base plate bottom surface directly to the roof surface and creates a water resistant seal.

DRAWINGS

These and other features, aspects, and advantages of the present invention will become better understood with regard to the following description, appended claims, and accompanying drawings where:

DESCRIPTION

Figure 1:
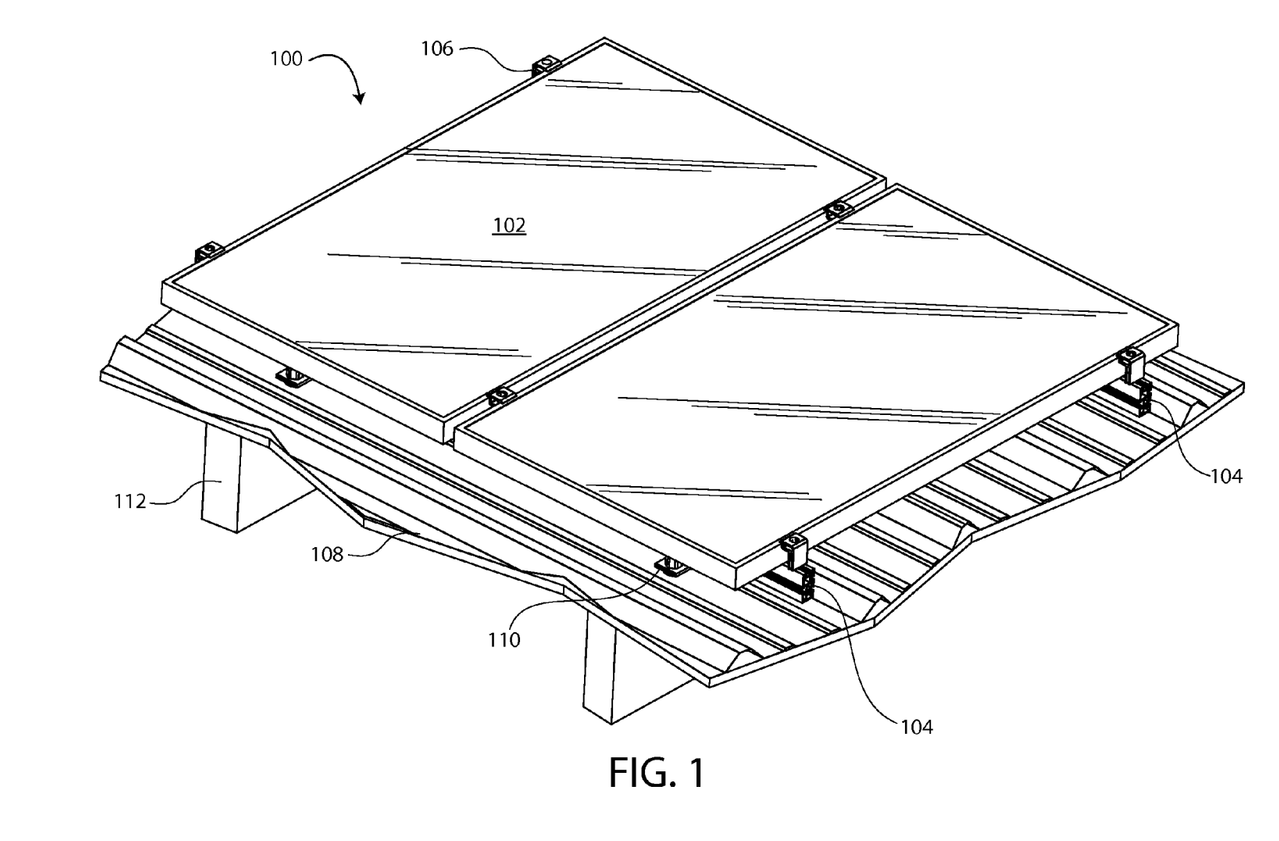
FIG. 1 shows a metal roof mounted solar photovoltaic system including mounting apparatus in accordance with principles of the invention.

Referring now to the drawings in detail wherein like numerals indicate like elements throughout the several views, FIG. 1 discloses a roof mounted solar photovoltaic system 100 including mounting apparatus in accordance with principles of the invention. FIG. 1 shows one or more solar photovoltaic panels 102 mounted on two or more rails 104. The solar photovoltaic panels 102 are attached to the rails 104 by mounting clips 106. The rails 104 are attached to a flat portion of the metal roof 108 by equipment mounting assembly 110. The equipment mount assembly 110 is secured to wood beam 112.

Figure 2A:
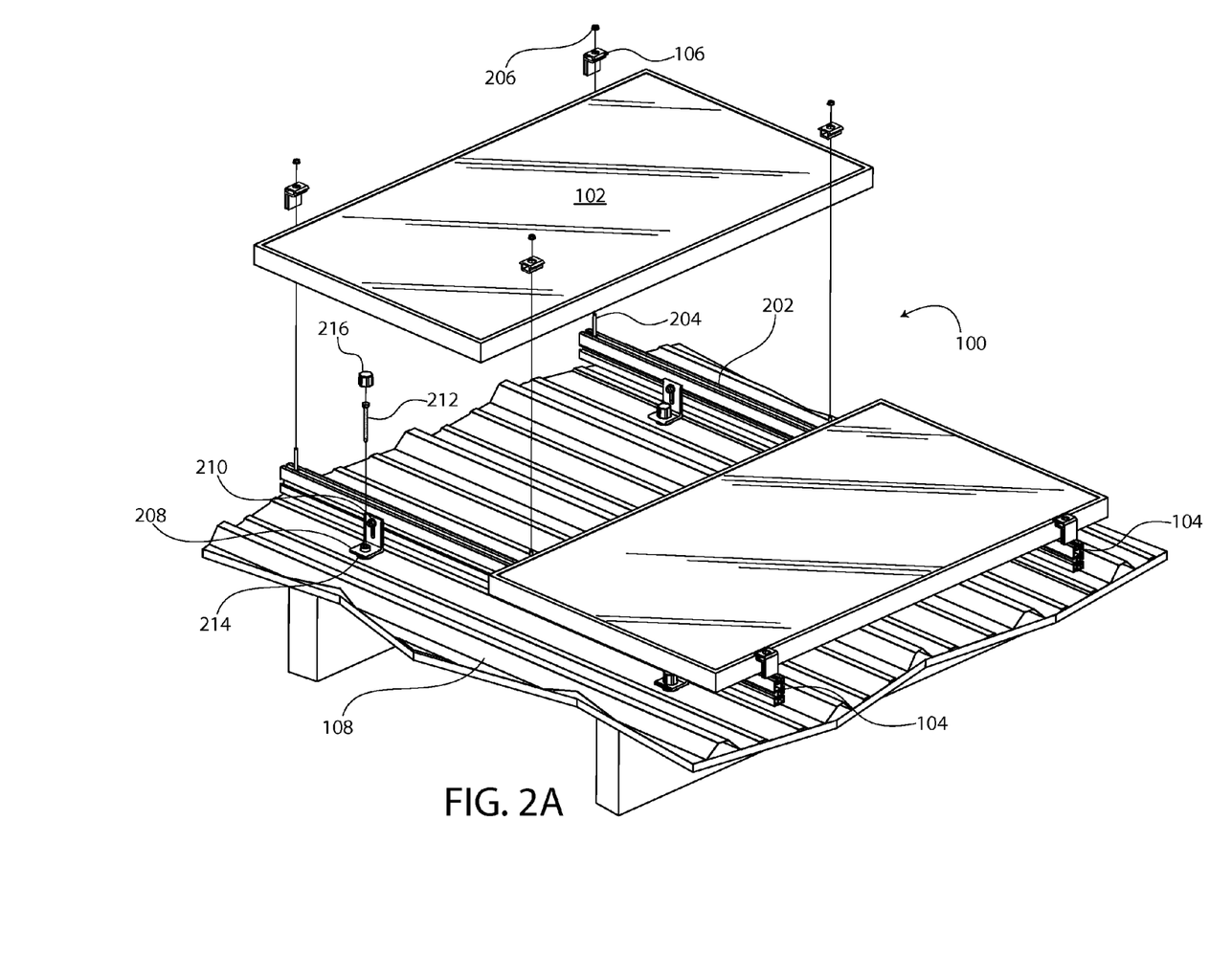
FIG. 2A shows a partial exploded view of the solar photovoltaic system of FIG. 1.
Figure 2B:
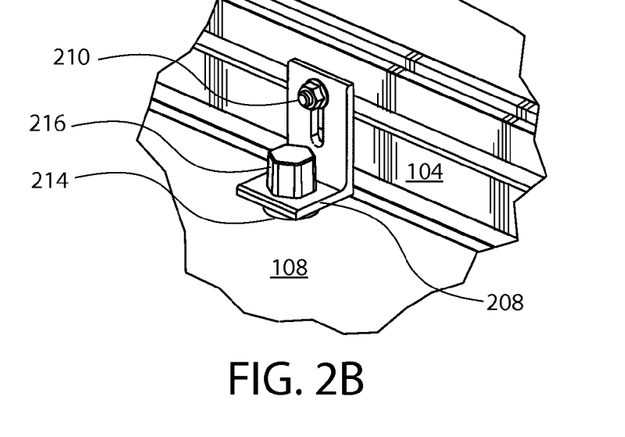
FIGS. 2B and 2C show detailed view of portions of FIG. 2A.
Figure 2C:
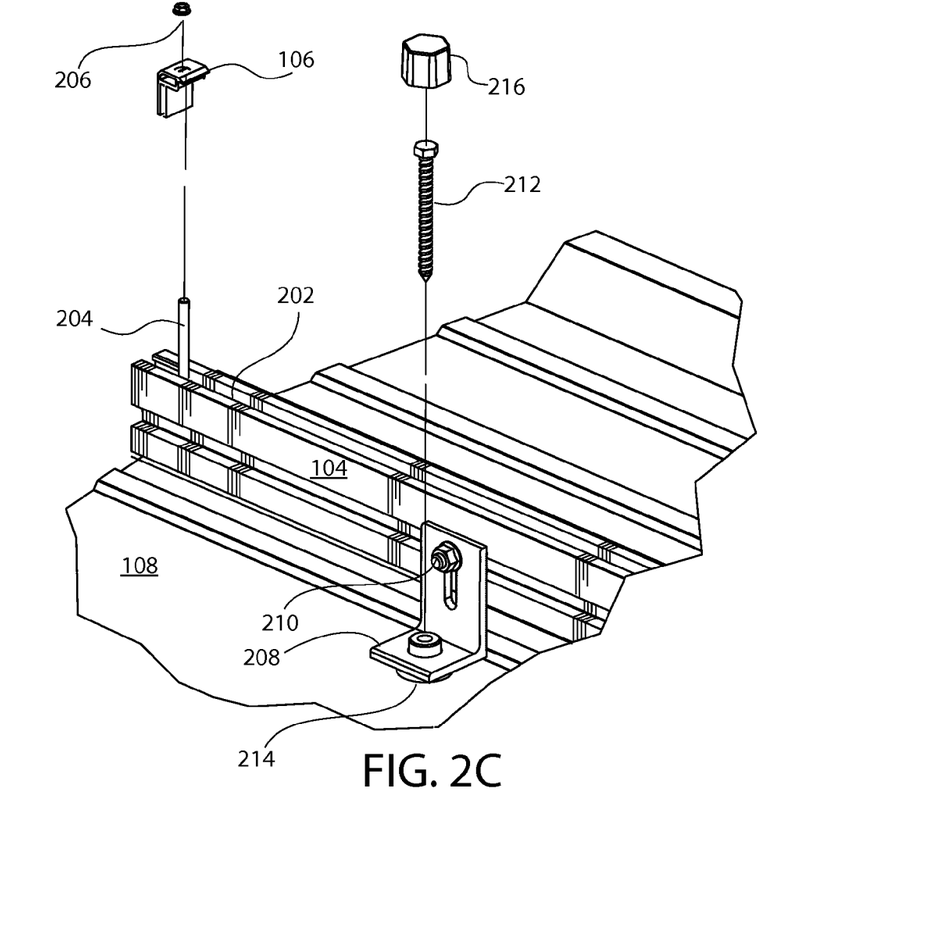

FIG. 2A illustrates a partially exploded view of the roof mounted solar photovoltaic system 100 of FIG. 1. FIGS. 2B and 2C show detailed views of sections of FIG. 2A. Referring to FIGS. 2A, 2B, and 2C, the solar photovoltaic panel 102 is mounted to a channel 202 in the top portion of the rail 104 is secured by a bolt 204, the mounting clip 106, and a nut 206. In FIGS. 2A, 2B, and 2C, the equipment mounting assembly 110 of FIG. 1 includes an L-bracket 208 that is secured to the rail 104 by a bolt (not shown) and a nut 210. The L-bracket 208 is secured to the metal roof 108 by a threaded fastener 212, a base plate 214, and a removable cover 216. While the L-bracket 208, the threaded fastener 212, the base plate 214, and the removable cover 216 are shown secured to the metal roof 108, it should be noted that it is also possible to secure this combination to shake or shingle roofs.

Figures 3, 4:
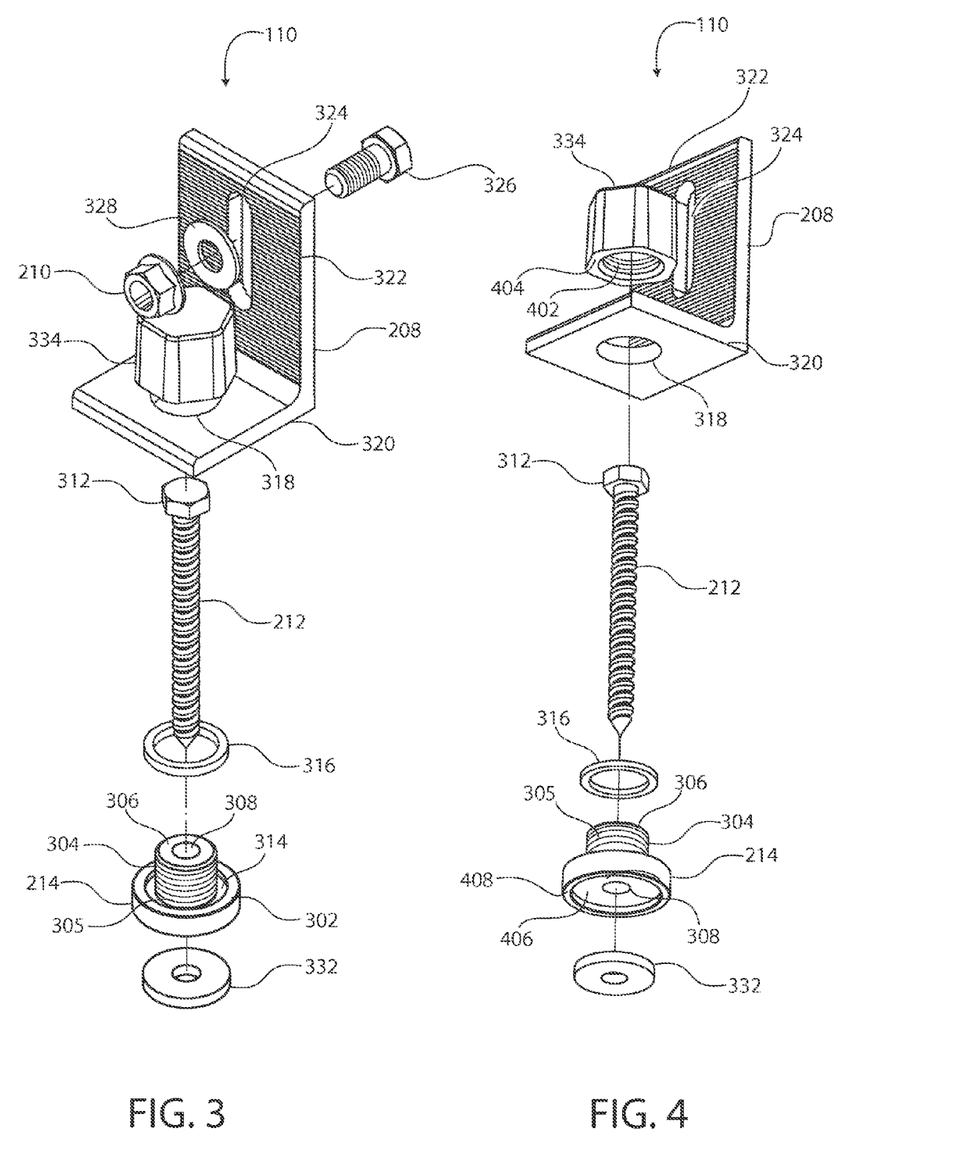
FIG. 3 shows an exploded view of the equipment mounting apparatus of FIG. 1
FIG. 4 shows an alternative exploded view of the equipment mounting apparatus of FIG. 3.
Figure 5:
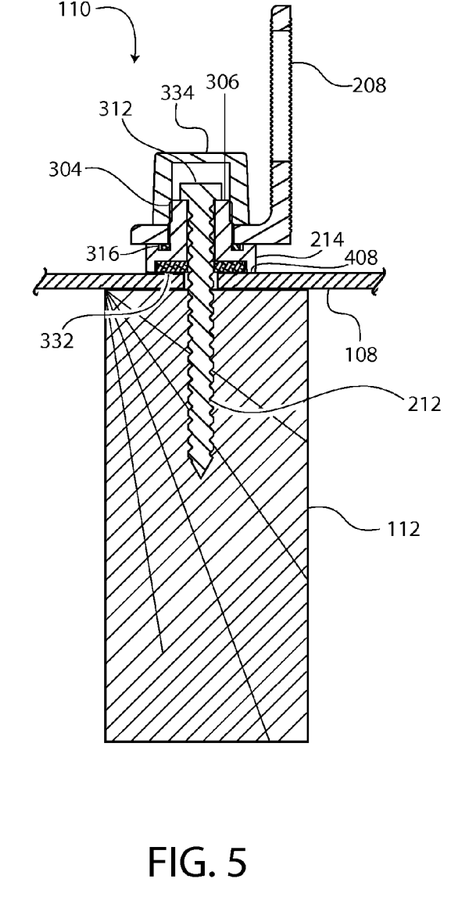
FIG. 5 shows a cross sectional view of the equipment mounting apparatus of FIG. 3 mounted to a roof structure and wood beam.
Figure 6:
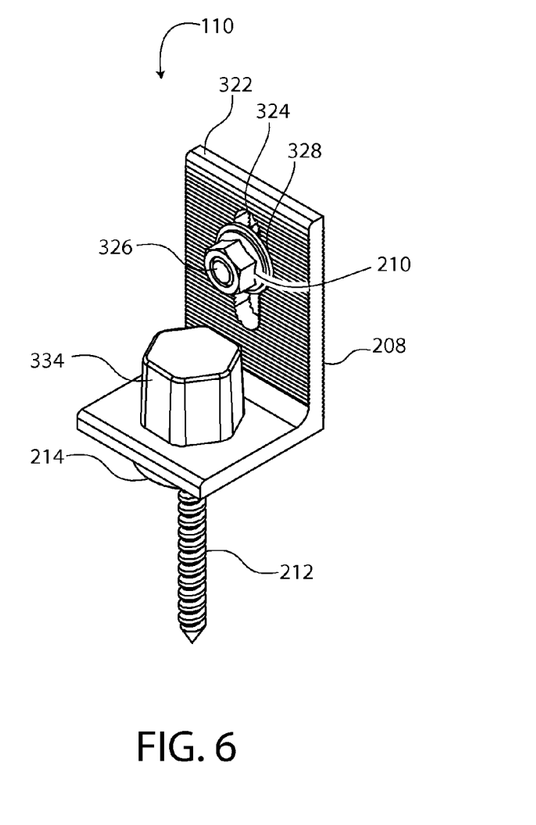
FIG. 6 shows an assembled view of the equipment mounting apparatus of FIG. 3.

FIGS. 3, 4, 5, and 6 shows several detailed views of the equipment mounting assembly 110. FIG. 3 shows a downward looking exploded view and FIG. 4 shows an upward looking exploded view of equipment mounting assembly 110. FIG. 5 shows a cross sectional view of the equipment mounting assembly 110 mounted to the metal roof 108 and secured to a wood beam 112. FIG. 6 shows an assembled view of the mounting assembly 110.

Referring to FIGS. 3 and 4, the base plate 214 includes an upper surface that includes an outer surface 302 and an upwardly projected portion 304. The upwardly projected portion 304 includes a threaded side portion 305. The upwardly projected portion 304 includes a top surface 306. The top surface 306 includes an aperture 308. Referring to FIG. 4, the aperture 308 extends through the bottom of the base plate 214. Referring to FIGS. 3, 4, and 5, the aperture 308 is disposed to receive a threaded fastener 212 and allow the body of the threaded fastener 212 to pass through the base plate 214. The top surface 306 of the upwardly projected portion 304 is disposed to seat the threaded fastener head 312, preventing it from sliding through the base plate 214. In FIGS. 3, 4, 5, 6 the threaded fastener 212 is a bolt with wood screw threading. Other threaded fasteners can be used, for example, wood screws, self-tapping sheet metal screws, self-tapping bolts, toggle bolts, or toggler bolts.

Referring to FIG. 3, the outer surface 302 also includes a groove 314 that circumscribes the upwardly projected portion 304. The groove 314 is inwardly defined by the outer perimeter of upwardly projected portion 304. In other configurations, it is possible to have a surface portion between the outer perimeter of upwardly projected portion 304 and the inner circumference of the groove 314. The groove 314 is disposed to receive and seat a first annular seal 316. Referring to FIGS. 3, 4, and 5, the first annular seal 316 is compressible and is typically made of an elastomeric material, synthetic or natural rubber, or from other materials with viscoelasticity.

Referring to FIGS. 3 and 4, the L-bracket 208 includes a first opening 318 on the bracket lower portion 320. The first opening 318 is sized and shaped to receive the upwardly projected portion 304 of the base plate 214 and to cover a substantial portion of the first annular seal 316. Referring to FIGS. 3, 4, and 6, the upper portion 322 of the L-bracket 208 includes a second opening 324. Referring to FIGS. 3 and 6, the second opening 324 is disposed to receive a threaded bolt 326, the threaded bolt 326 is held in place by a washer 328 and the nut 210. The head of the threaded bolt 326 held by the rail 104 of FIGS. 2A, 2B, and 2C or a similar rail. The threaded bolt 326, washer 328, and nut 210 assembly secure the L-bracket 208 to the rail 104. Note other threaded fasteners in combination with the nut 210 can be used, such as machine screws, in place of the threaded bolt 326, as long as they can secure the L-bracket to the rail 104.

Referring to FIGS. 3, 4, and 5, a second annular seal 332 receives the threaded fastener 212 through a central opening. The second annular seal 332 is compressible and is typically made of an elastomeric material, synthetic or natural rubber, or from other materials with viscoelasticity.

A removable cover piece 334 is disposed to engage and hold the upwardly projected portion 304 of the base plate 214. The removable cover is shaped to receive a wrench or tool for turning. Typically, the side surface has a hexagonal profile to receive a socket wrench, box wrench, or open-ended wrench. Other shapes and profiles are possible. The removable cover portion, the threaded fastener head 312, and the top surface 306 of the upwardly projected portion 304. Referring to FIG. 4, the removable cover piece 334 includes a threaded cavity 402. The threaded cavity 402 and threaded side portion 305 of the upwardly projected portion 304 form a complementary threaded pair. The removable cover piece 334 includes an outer bottom portion 404 that circumscribes the threaded cavity 402. Referring to FIG. 3, screwing the removable cover piece 334 into the upwardly projected portion 304 compresses the first annular seal 316 against the bottom of the L-bracket 208 and forms a surface-to-surface contact between the bottom of the L-bracket 208 and a portion of the outer surface 302 of the base plate 214 upper surface. Referring to FIG. 4, the outer bottom portion 404 of the removable cover piece 334 makes surface-to-surface contact with L-bracket 208 top surface.

The base plate 214 includes a counterbore 406 forming a portion of the bottom surface 408. The counterbore 406 includes the bottom of the aperture 308. The counterbore 406 is disposed to receive and seat the second annular seal 332. Referring to FIG. 5, the threaded fastener 212 compresses the second annular seal 332 and secures the bottom surface 408 of the base plate 214 in direct surface-to-surface contact to the metal roof 108. The threaded fastener 212 screws in to the wood beam 112 and creates a secure connection between the base plate 214 bottom surface 408 and the metal roof 108 upper surface. This arrangement minimizes air and light to the seal and is water resistant.

Note that while FIG. 5 illustrates the equipment assembly mounted to the metal roof 108, the assembly can also be mounted to flat portions of other types of roofs including shake or composite roofs using the threaded fastener 212 to secure the assembly to the wood beam 112 so that the base plate 214 and roof surface make surface-to-surface contact.

Figure 7:
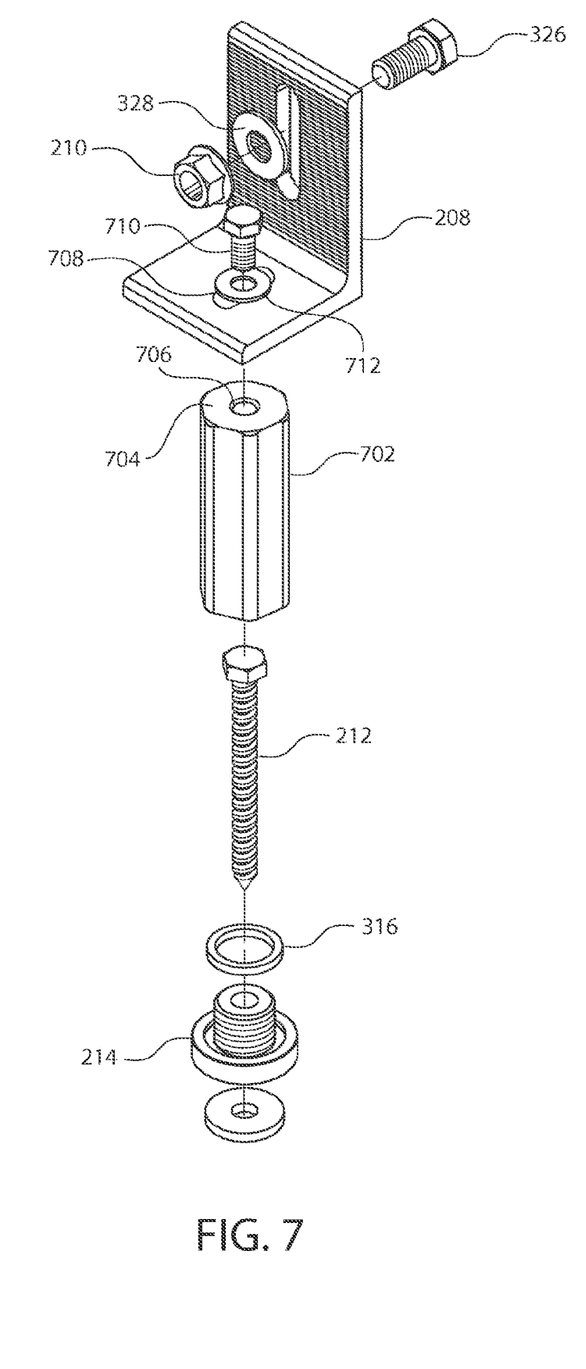
FIG. 7 shows an exploded view of an equipment mounting apparatus for metal roofs and other roof structures in accordance with principles of the invention that includes a standoff to mount the equipment away from the metal roof surface.
Figure 8:
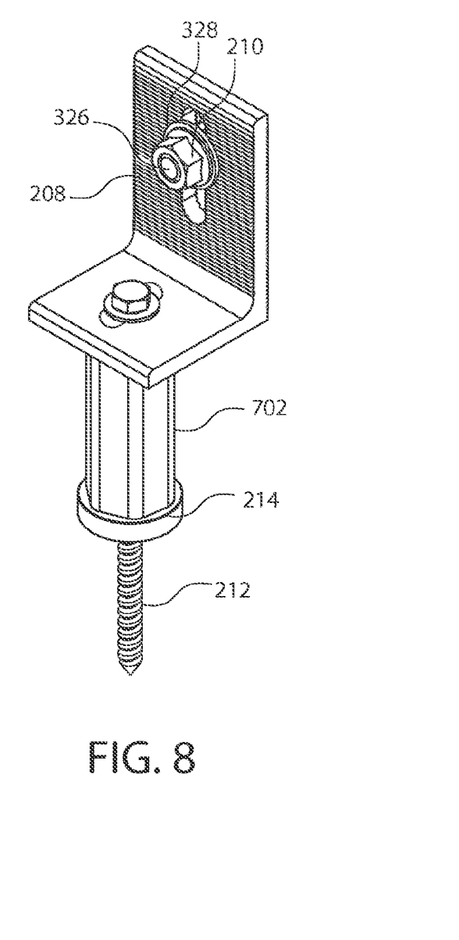
FIG. 8 shows an assembled view of the equipment mounting apparatus of FIG. 7.
Figures 9, 10:
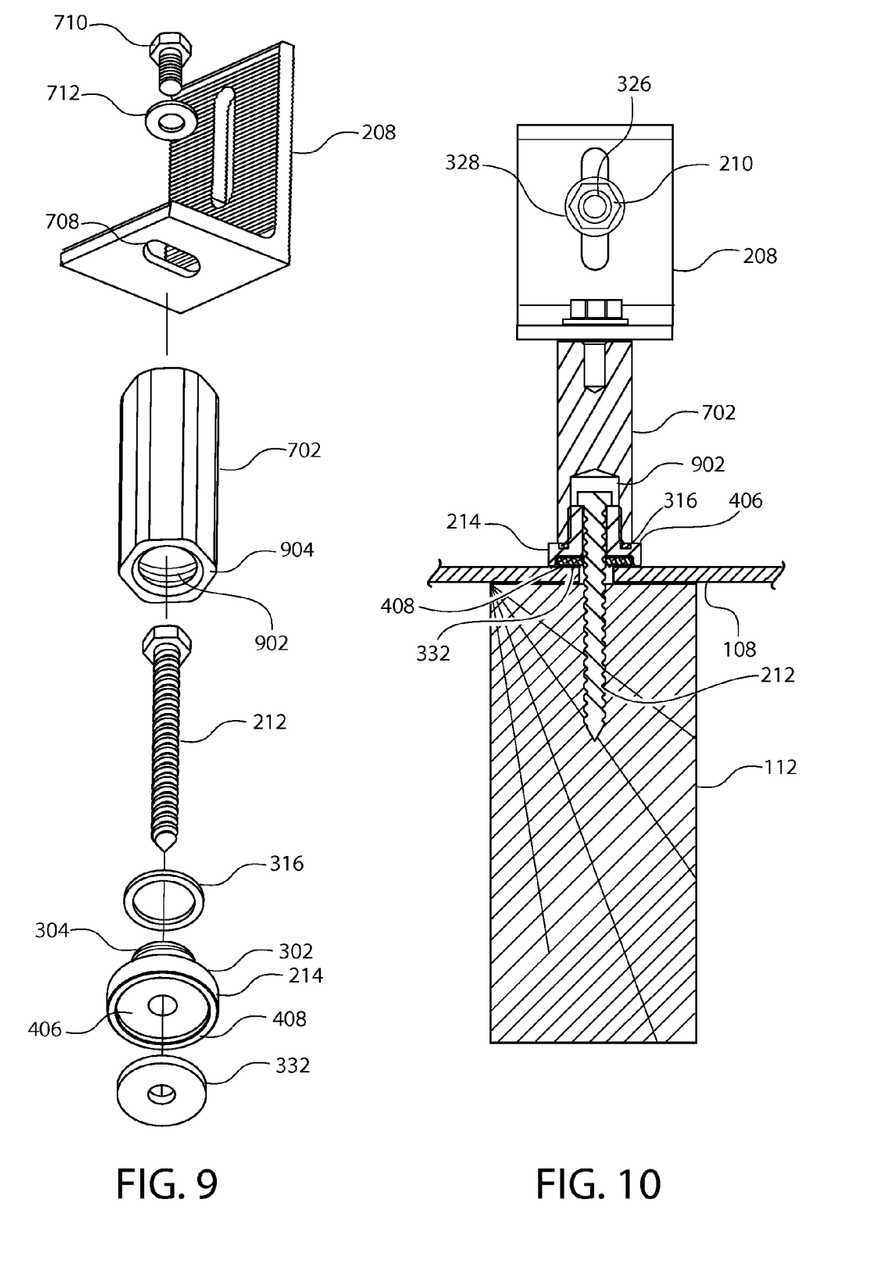
FIG. 9 shows an alternative exploded view of the equipment mounting apparatus of FIG. 7.
FIG. 10 shows a cross sectional view of the equipment mounting apparatus of FIG. 7 mounted to a roof structure and wood beam.

The embodiment of FIGS. 3, 4, 5, and 6 utilize the L-bracket 208 as an intermediary between the base plate 214 and the removable cover piece 334. In FIGS. 7, 8, 9, and 10, there is no intermediary. FIGS. 7, 8, and 10, shows the base plate 214, threaded fastener 212, L-bracket 208, threaded bolt 326, washer 328, and nut 210 in combination. Referring to FIGS. 7, 8, 9, and 10, a standoff 702 replaces the removable cover piece 334 of FIGS. 3, 4, 5, and 6. Referring to FIG. 7, the standoff 702 has a top surface 704 with a threaded aperture 706 for receiving the L-bracket 208 through L-bracket aperture 708 with a threaded bolt 710 and washer 712.

Referring to FIG. 9, the standoff 702 bottom surface includes a threaded cavity 902 and an outer portion 904. The threaded cavity 902 has complementary threading to the upwardly projected portion 304 so that the standoff 702 can be secured to the base plate 214. Referring to FIGS. 9 and 10, securing the standoff 702 to the base plate 214 compresses the first annular seal 316 and couples the outer portion 904 of the standoff 702 directly to the outer surface 302 of base plate 214 upper surface.

Referring to FIGS. 7, 9, and 10, the described combination, creates a water resistant seal between the standoff 702 and the base plate 214 and helps to protect the threaded fastener 212 and the first annular seal 316 from light and moisture. Referring to FIG. 10, the threaded cavity 902 is enclosed on the sides and upper surface in order to help protect the threaded fastener 212 and base plate 214 from the elements.

The base plate 214 engages the metal roof 108 in the same manner as described for FIGS. 3, 4, 5, and 6. The threaded fastener 212 screwed into the wood beam 112 through the metal roof 108. In FIGS. 9 and 10, the threaded fastener 212 compresses the second annular seal 332 into the counterbore 406 and causes the bottom surface 408 of the base plate 214 into direct surface-to-surface contact with the metal roof 108.

Figure 11:
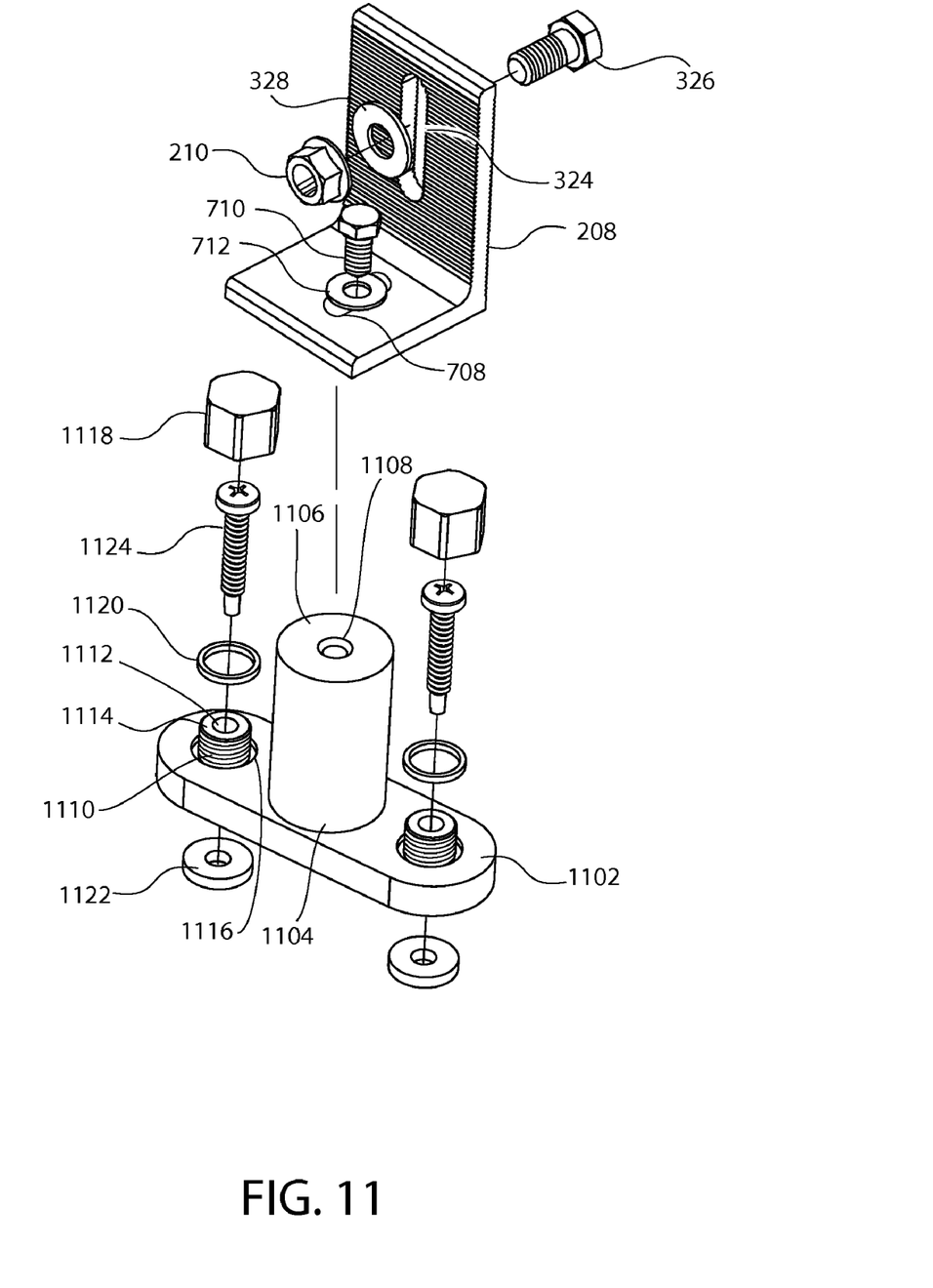
FIG. 11 shows an exploded view of an equipment mounting apparatus for metal roofs and other roof structures in accordance with principles of the invention with a plurality of fasteners and an integrated standoff separate from the fasteners.
Figure 12:
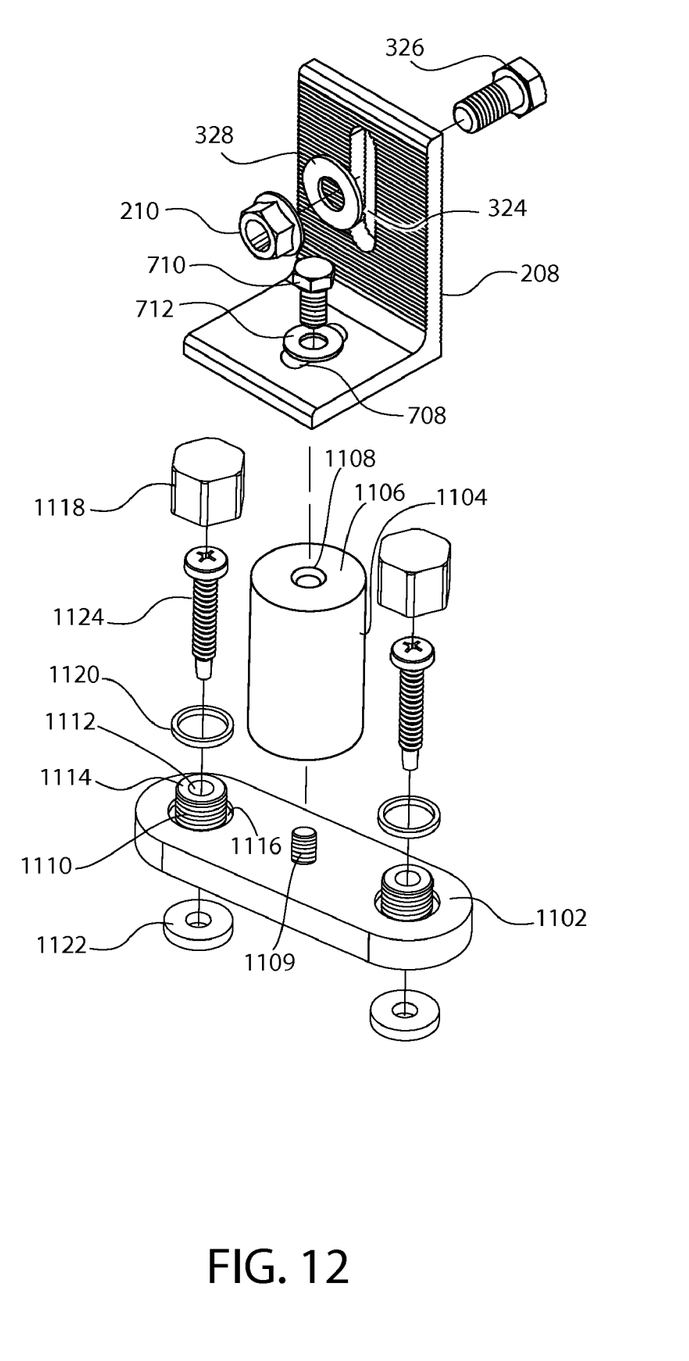
FIG. 12 shows an exploded view of an equipment mounting apparatus for metal roofs and other roof structures in accordance with principles of the invention with a plurality of fasteners and with a removable standoff separate from the fasteners.
Figure 13:
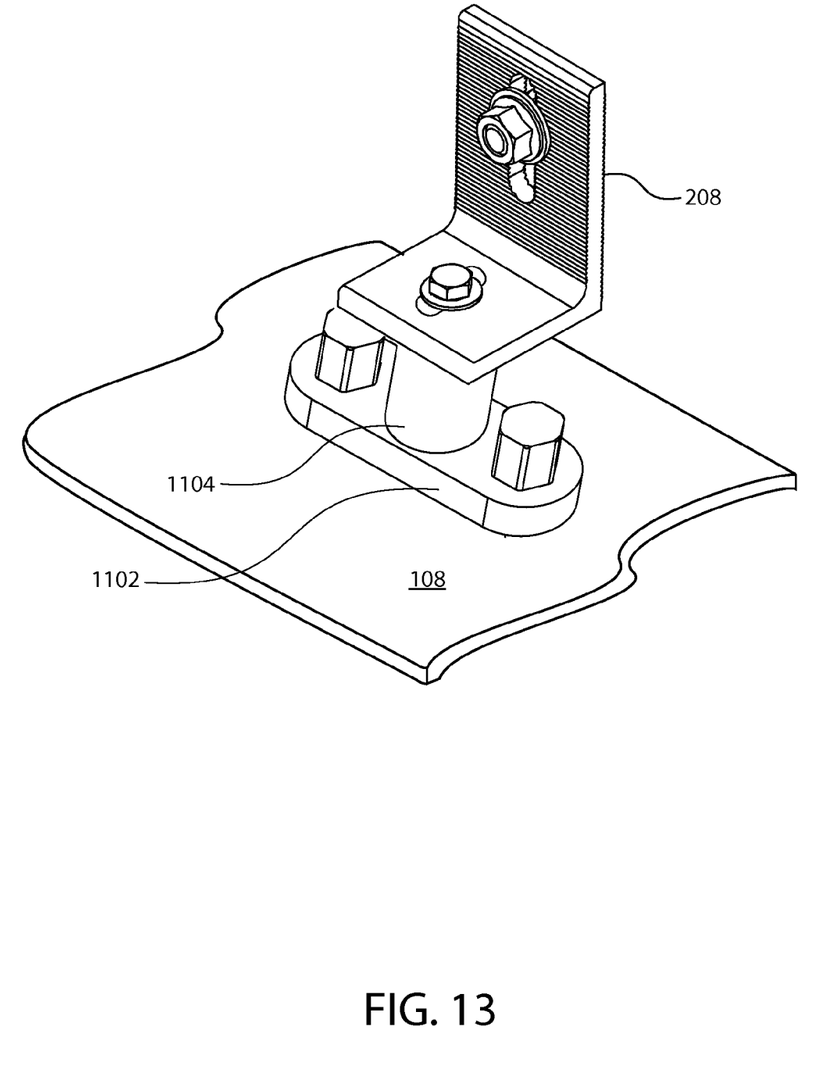
FIG. 13 shows an assembled view of an equipment mounting apparatus of either FIG. 11 or FIG. 12.

It may be desirable to have a standoff that does not act as a cover for a roof fastener. In FIGS. 11, 12, and 13, a base plate 1102 receives the L-bracket 208 with a standoff 1104. In FIGS. 11 and 12, the standoff 1104 has a top surface 1106 with a threaded aperture 1108 for receiving the L-bracket 208 through L-bracket aperture 708 with a threaded bolt 710 and washer 712. The second opening 324 of the L-bracket 208 is disposed to receive a threaded bolt 326 and held in place by a washer 328 and a nut 210 as previously described. The head of the threaded bolt 326 held by the rail 104 of FIGS. 2A, 2B, and 2C or a similar rail. The threaded bolt 326, washer 328, and nut 210 assembly secure the L-bracket 208 to the rail 104.

The standoff 1104 may be integrated into base plate 1102, as shown in FIG. 11, for example, by machining, casting, welding, or molding. Alternatively, it may be desirable to have the standoff 1104 as a separately attachable piece. Referring to FIG. 12, the standoff 1104 is attached to the base plate 1102 by a threaded fastener 1109 that screws into the base plate 1102 and the bottom of the standoff 1104.

FIGS. 11 and 12 show two similarly configured fastening assemblies. Each assembly shares a common base plate 1102. Each assembly includes an upwardly projected portion 1110, an aperture 1112, a top surface 1114 of the upwardly projected portion 1110, a groove 1116 that circumscribes the upwardly projected portion 1110, and a removable cover piece 1118. The bottom of the base plate 1102 also includes a counterbore (not shown); the counterbore is similar in configuration to the counterbore 406 of FIG. 4.

The groove 1116 is configured to receive a first annular seal 1120 and the counterbore is configured to receive a second annular seal 1122. The top surface 1114 is disposed to seat a threaded fastener 1124 and receive the fastener body through the aperture 1112. As previously described, the fastener can be a bolt with wood screw threading, a wood screw, self-tapping sheet metal screw, self-tapping bolt, toggle bolt, or toggler bolts. The choice of fastener depends on the roof type and structure. For illustrative purposes, the threaded fastener 1124 of FIGS. 11 and 12 is a self-tapping screw used to secure the base plate 1102 to metal purlins beneath the metal roof 108 of FIG. 13.

The removable cover piece 1118 of FIGS. 11 and 12 is similarly constructed and configured to the removable cover piece 334 of FIGS. 3, 4, 5, and 6. The removable cover bottom surface includes a threaded cavity and an outer portion. The threaded cavity has complementary threading to the upwardly projected portion 1110 so that the removable cover piece 1118 can be secured to the base plate 1102. Securing the removable cover piece 1118 to the base plate 1102 compresses the first annular seal 1120 and couples the bottom surface of the removable cover piece 1118 directly to the base plate 1102 upper surface. This combination creates a water-resistant seal between the removable cover piece 1118 and the base plate 1102 and helps to protect the threaded fastener 1124 and the first annular seal 1120 from air, sunlight, and moisture.

The base plate 1102 engages the metal roof 108 of FIG. 13 in the same manner as described for FIGS. 3, 4, 5, and 6. Referring to FIGS. 11 and 12, the threaded fastener 1124 compresses the second annular seal 1122 into the counterbore and engages the bottom surface of the base plate 1102 into direct surface-to-surface contact with the metal roof 108.

Figure 14:
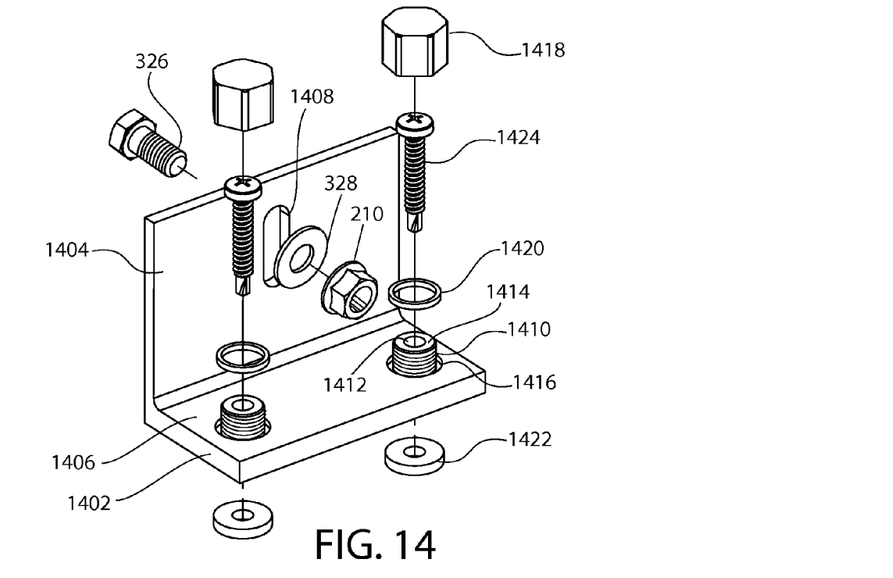
FIG. 14 shows an exploded view of an equipment mounting apparatus for metal roofs and other roof structures, in accordance with principles of the invention, including a plurality of fasteners and the base plate in the form of an L-bracket.
Figure 15:
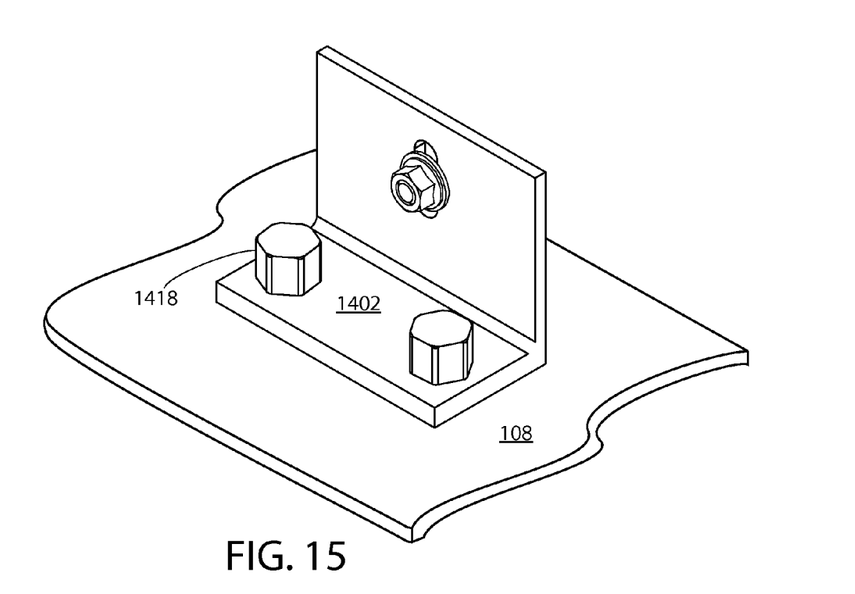
FIG. 15 shows an assembled view of the equipment mounting apparatus of FIG. 14.

FIGS. 14 and 15 eliminate the need for an external L-bracket by integrating the L-bracket into the base plate. FIGS. 14 and 15 show a base plate 1402 in the form of an L-bracket. FIG. 14 shows the base plate having an upper bracket portion 1404 and a lower bracket portion 1406. The upper bracket portion 1404 is configured to connect the base plate to roof mounted equipment, such as a solar photovoltaic panel 102 of FIG. 2A. The bracket secures to the equipment in similarly as disclosed in FIGS. 2A, 2B, and 2C. Referring back to FIG. 14, the upper bracket portion 1404 of the base plate 1402 includes an aperture 1408 for receiving receive a threaded bolt 326; the threaded bolt 326 is held in place by a washer 328 and a nut 210. The head of the threaded bolt 326 is held by the rail 104 of FIGS. 2A, 2B, and 2C or a similar rail. In FIG. 14, the threaded bolt 326, washer 328, and nut 210 combination secures the upper bracket portion 1404 to the rail 104 of FIG. 2A.

FIG. 14 shows two similarly configured fastening assemblies. Each assembly shares a common base plate 1402. Each assembly includes an upwardly projected portion 1410, an aperture 1412, a top surface 1414 of the upwardly projected portion 1410, a groove 1416 that circumscribes the upwardly projected portion 1410, and a removable cover piece 1418. The bottom of the base plate 1402 also includes a counterbore (not shown); the counterbore is similar in configuration to the counterbore 406 of FIG. 4.

The groove 1416 is configured to receive a first annular seal 1420 and the counterbore is configured to receive a second annular seal 1422. The top surface 1414 is disposed to seat a threaded fastener 1424 and receive the fastener body through the aperture 1412. As previously described, the fastener can be a bolt with wood screw threading, a wood screw, self-tapping sheet metal screw, self-tapping bolt, toggle bolt, or toggler bolts. The choice of fastener depends on the roof type and structure. For illustrative purposes, the threaded fastener 1424 of FIG. 14 is a self-tapping screw used to secure the base plate 1402 to metal purlins through the metal roof 108 of FIG. 13.

In FIGS. 14 and 15, the removable cover piece 1418 is similarly constructed and configured to the removable cover piece 334 of FIGS. 3, 4, 5, and 6. Referring to FIG. 14, the removable cover piece 1418 includes a bottom surface with a threaded cavity and an outer portion. The threaded cavity has complementary threading to the upwardly projected portion 1410 so that the removable cover piece 1418 can be secured to the base plate 1402. Securing the removable cover piece 1418 to the base plate 1402 compresses the first annular seal 1420 and couples the bottom surface of the removable cover piece 1418 directly to the base plate 1402 upper surface. This combination creates a water resistant seal between the removable cover piece 1418 and the base plate 1402 and helps to protect the threaded fastener 1424 and the first annular seal 1420 from light and moisture.

Referring to both FIGS. 14 and 15, the base plate 1402 engages the metal roof 108 in the same manner as described for FIGS. 3, 4, 5, and 6. The threaded fastener 1424 compresses the second annular seal 1422 into the counterbore and engages the bottom surface of the base plate 1402 into direct surface-to-surface contact with the metal roof 108 of FIG. 15.

Figure 16:
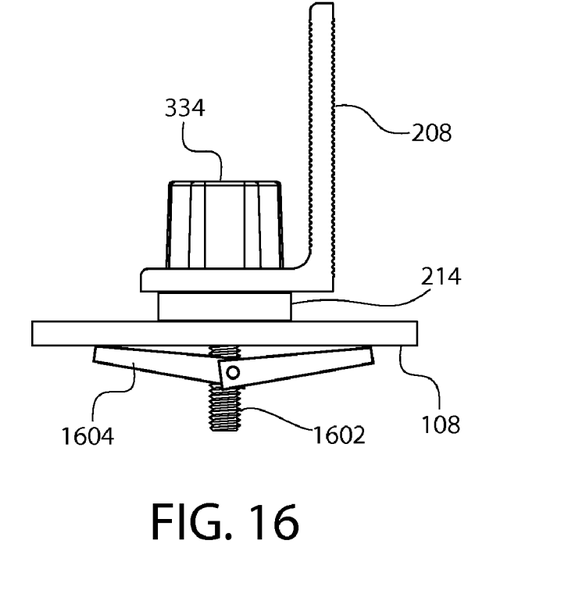
FIG. 16 shows an equipment mounting apparatus for metal roofs and other roof structures in accordance with principles of the invention that includes a toggle bolt for securing the structure to a metal roof.
Figure 17:
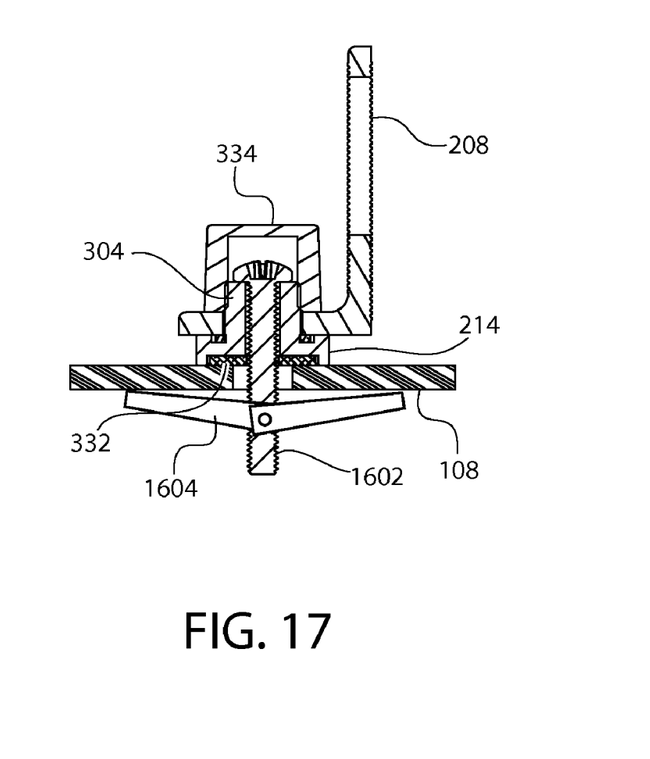
FIG. 17 shows a cross sectional view of the equipment mounting apparatus of FIG. 16.

In some installations of solar photovoltaic structures or other roof mounted equipment assemblies, it may not be possible or desirable to mount the base plate to wood beams or metal purlins. FIGS. 16 and 17 shows the configuration of FIGS. 3, 4, 5, and 6 with L-bracket 208, cover portion 334, and base plate 214, where in place of a wood threaded bolt, a toggle bolt 1602 and wing assembly 1604 secures the base plate 214 to the metal roof 108. Referring to FIG. 17, the toggle bolt 1602 is seated to the upwardly projected portion 304 in the same manner as the threaded fastener 212 of FIG. 5. The toggle bolt 1602 and wing assembly 1604 are mounted through a hole drilled through the metal roof 108 in a manner know to those skilled in the art. The toggle bolt 1602 and wing assembly 1604 secures the base plate 214 in a similar manner as previously described. Tightening the toggle bolt 1602 compresses the second annular seal 332 into the counterbore presses the bottom surface of the base plate 214 into direct contact with the roof surface.

Accordingly, a solar panel and equipment mount apparatus for metal roofs and other roof structures where the bottom of the assembly makes direct contact with the roof surface with the herein presented objectives has been described. Those skilled in the art should appreciate that the invention is not intended to be limited to the above described currently preferred embodiments of the invention. Various modifications will be apparent, particularly upon consideration of the teachings provided herein. Thus, the invention should be understood to extend to that subject matter as defined in the following claims, and equivalents thereof.

What is claimed is:

1. An apparatus for mounting equipment to a roof, comprising:
 a base plate including a bottom surface and an upper surface;
 the bottom surface including a portion forming a counterbore;
 the upper surface including a projection forming an upwardly projected portion with a non-threaded aperture extending through the counterbore, the projection including a threaded outer circumference and a top surface, and the upper surface further including an outer surface having a groove circumscribing the projection;
 a first compressible annular seal;
 a second compressible annular seal;
 the groove receives and seats the first compressible annular seal;
 the counterbore receives and seats the second compressible annular seal;
 the projection configured to receive a threaded fastener, a portion of which passes through the aperture and secures the base plate to the roof, the projection further sized and shaped to seat a head portion of the fastener against the top surface of the projection;
 a cover piece including a bottom portion forming an inner threaded cavity, the cover piece configured to receive and hold the projection, cover the fastener, and compress the first annular seal; and
 the apparatus configured to provide direct contact between a portion of the bottom surface of the base plate and a top surface of the roof.

2. The apparatus of claim 1, wherein the cover piece is a standoff, the standoff including a top surface with a second aperture configured to receive a second threaded fastener.

3. The apparatus of claim 2, further including:
 an L-bracket including a lower portion with an opening sized and shaped to secure the L-bracket to the top surface of the standoff with the second threaded fastener.

4. The apparatus of claim 3, wherein the L-bracket includes an upper portion with an second opening sized and shaped to receive a third fastener for securing the L-bracket to a slotted rail.

5. The apparatus of claim 3, further including:
 a slotted rail;
 the L-bracket including an upper portion with a second opening sized and shaped to receive a third fastener for securing the L-bracket to the slotted rail; and
 a solar photovoltaic panel mounted to the slotted rail.

6. The apparatus of claim 1, further including:
 an L-bracket with a lower portion including a top surface, a bottom surface, and first opening sized and shaped to receive the upwardly projected portion;
 the cover piece including a bottom surface circumscribing the inner threaded cavity; and
 the cover piece, L-bracket, and base plate in combination configured to secure a portion of the bottom surface of the cover piece against the top surface of the L-bracket, and compress the first annular seal against the bottom surface of the L-bracket.

7. The apparatus of claim 6, wherein the L-bracket includes an upper portion with an second opening sized and shaped to receive a third fastener for securing the L-bracket to a slotted rail.

8. The apparatus of claim 7, further including:
 a slotted rail;
 the L-bracket including an upper portion with a second opening sized and shaped to receive a third fastener for securing the L-bracket to the slotted rail; and
 a solar photovoltaic panel mounted to the slotted rail.

9. The apparatus of claim 1, wherein:
 the base plate is configured as an L-bracket with an upper bracket portion and a lower bracket portion; and the lower bracket portion includes the upwardly projected portion, the groove, and the counterbore.

10. The apparatus of claim 9, wherein:
the upper bracket portion is configured to receive a threaded fastener for securing a slotted rail.

11. The apparatus of claim 10, further including:
a slotted rail;
the upper bracket portion is configured to receive a threaded fastener for securing the slotted rail; and
a solar photovoltaic panel mounted to the slotted rail.

12. The apparatus of claim 1, further including:
a standoff separate from the cover piece; and
the standoff including a top surface with a second aperture configured to receive a second threaded fastener.

13. The apparatus of claim 12 wherein the standoff is integrated into the base plate.

14. The apparatus of claim 12 further including:
an L-bracket including a lower portion with an opening sized and shaped to secure the L-bracket to the top surface of the standoff with the second threaded fastener.

15. The apparatus of claim 14, wherein the L-bracket includes an upper portion with a second opening sized and shaped to receive a third fastener for securing the L-bracket to a slotted rail.

16. The apparatus of claim 15, further including:
a slotted rail;
the L-bracket including an upper portion with a second opening sized and shaped to receive a third fastener for securing the L-bracket to the slotted rail; and
a solar photovoltaic panel mounted to the slotted rail.

* * * * *